(12) United States Patent
Sterne

(10) Patent No.: US 7,509,674 B2
(45) Date of Patent: Mar. 24, 2009

(54) ACCESS CONTROL LISTING MECHANISM FOR ROUTERS

(75) Inventor: Jason Sterne, Ottawa (CA)

(73) Assignee: Alcatel Lucent, Paris (FR)

( * ) Notice: Subject to any disclaimer, the term of this patent is extended or adjusted under 35 U.S.C. 154(b) by 995 days.

(21) Appl. No.: 10/679,288

(22) Filed: Oct. 7, 2003

(65) Prior Publication Data

US 2005/0076138 A1 Apr. 7, 2005

(51) Int. Cl.
*G06F 17/00* (2006.01)

(52) U.S. Cl. .......................... 726/13; 726/11; 709/224; 709/229; 709/238

(58) Field of Classification Search .................. None
See application file for complete search history.

(56) References Cited

U.S. PATENT DOCUMENTS

| | | | |
|---|---|---|---|
| 6,377,577 B1 | 4/2002 | Bechtolsheim et al. | |
| 6,600,744 B1 * | 7/2003 | Carr et al. | 370/392 |
| 6,854,063 B1 * | 2/2005 | Qu et al. | 726/13 |
| 7,028,098 B2 * | 4/2006 | Mate et al. | 709/238 |
| 7,133,914 B1 * | 11/2006 | Holbrook | 709/224 |
| 7,143,438 B1 * | 11/2006 | Coss et al. | 726/11 |
| 7,225,263 B1 * | 5/2007 | Clymer et al. | 709/229 |
| 7,366,830 B1 * | 4/2008 | Maheshwari | 711/108 |
| 2003/0067874 A1 | 4/2003 | See et al. | |

* cited by examiner

*Primary Examiner*—Pramila Parthasarathy

(57) ABSTRACT

A method and apparatus are provided for maintaining access control lists (ACLs) within TCAM on a line card in a data packet router, the rules being applied to incoming data packets. Each interface may be associated with multiple ACLs, and multiple interfaces may be associated with single shared ACLs. The shared ACLs include rules applicable to more than one interface. Other ACLs are specific to a particular interface. When searching for a rule to apply to an incoming data packet, the filter searches both the specific ACL and the shared ACLs associated with the interface over which the data packet arrived. Using the shared ACLs, duplication of common rules is reduced, thereby reducing the total number of rules stored on the line card and saving memory storage space. The invention is also applicable to sets of rules other than ACLs.

21 Claims, 3 Drawing Sheets

ACCESS CONTROL LISTING MECHANISM FOR ROUTERS

FIELD OF THE INVENTION

The invention relates to router interfaces in telecommunication systems, and more particularly to access control lists associated with such interfaces.

BACKGROUND OF THE INVENTION

Internet routers in communication systems receive internet protocol (IP) packets at interfaces on line cards. A router contains numerous line cards, each of which can have a number of interfaces. Typically, each interface has an associated access control list (ACL) stored on the line card within a Ternary Content Addressable Memory (TCAM). An ACL is a set of rules to be applied to IP packets in order to filter unwanted packets, or perform other actions on packets such as counting or copying. Each rule is composed of a key and an action. When an IP packet arrives through an interface, the router extracts specific fields from the packet to form a key and searches the ACL associated with the interface for a rule having a matching key. If a rule is found, the filter applies the action associated with the rule to the packet.

Interfaces may have identical sets of rules. Some routers take advantage of this to simplify configuration and troubleshooting, and to improve robustness. Sets of rule are copied between ACLs. However, once loaded into the TCAM, each rule of each ACL of each interface is stored and accessed separately. There is therefore no saving of TCAM storage space. Other routers go further and share a single ACL between two or more interfaces. While this somewhat reduces the amount of TCAM storage space needed, this is only possible if the interfaces have all their rules in common.

Improvements in the storage capacity of TCAMs has not progressed as quickly as improvements in access rate. Due to space and power constraints associated with TCAMs and to the cost of TCAMs, it is preferable to keep the number and size of TCAMs on each line card to a minimum. This may be difficult in some situations, as routers often support hundreds of interfaces and hundreds of ACLs, requiring large TCAM storage space. Line interface cards which minimized the total number of rules being stored would allow fewer or smaller TCAMs to be used, thereby saving space and power. Alternatively, such cards could support more rules for the same space and power usage.

SUMMARY OF THE INVENTION

In accordance with one aspect of the invention, a method is provided for determining rules to be applied to a data packet arriving at a first interface within a data packet router. At least two sets of rules are associated with the first interface, at least one of the sets of rules being a shared set of rules also associated with a second interface. A key of the data packet is determined. The at least two sets of rules are searched for at least one rule matching the key.

In accordance with another aspect of the invention, a method is provided for providing security in a data packet router at which a data packet arrives at a first interface. At least two sets of rules are associated with the first interface, at least one of the sets of rules being a shared set of rules also associated with a second interface, each rule in the at least two sets of rules having an associated action. A key of the data packet is determined. The at least two sets of rules are searched for at least one rule matching the key. If at least one rule matching the key is found, the action associated with each of the at least one rule is applied to the data packet.

A line card for implementing the methods of the invention is provided. The methods of the invention may also be stored as instructions on a computer-readable medium.

The method and line interface card of the present invention allow rules to be shared between interfaces, while still allowing rules specific to individual interface cards to be used. By sharing rules between interfaces rather than just copying the rules, memory storage space (such as TCAM) is saved, thereby reducing the cost and power consumption of the line card.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
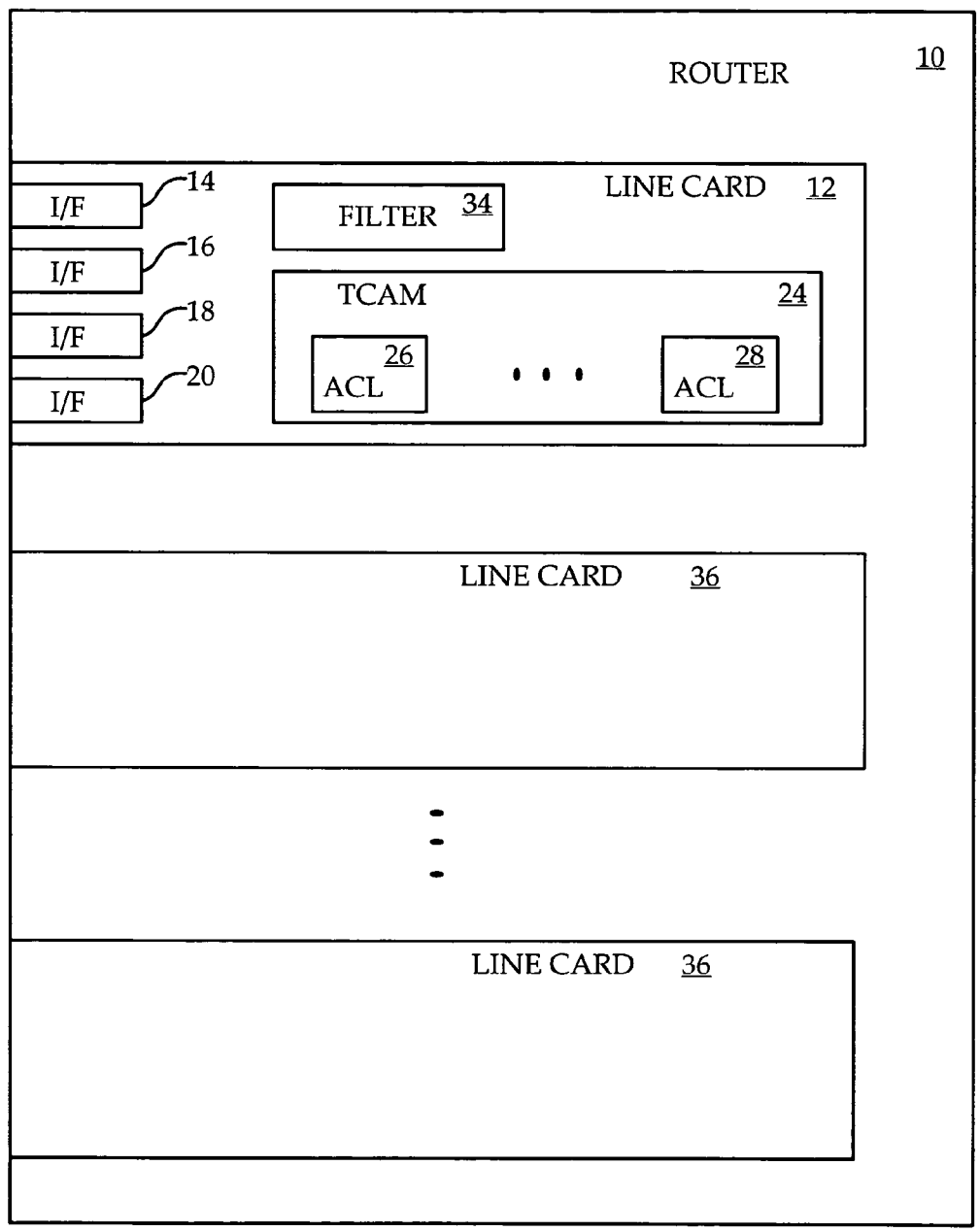
FIG. 1 is a block diagram of a router according to one embodiment of the invention.

Referring to FIG. 1, a router 10 in accordance with a preferred embodiment of the invention is shown. The router 10 includes a line card 12. The line card 12 includes four interfaces 14, 16, 18, and 20, over which internet protocol (IP) packets arrive. The line card 12 also includes a Ternary Content Addressable Memory (TCAM) 24. The TCAM stores a plurality of Access Control Lists (ACLs). At least one ACL is a specific ACL 26 and at least one ACL is a shared ACL 28. Each interface is associated with at least one ACL, as described below.

The line card 12 also includes a filter 34. For each IP packet, the filter 34 extracts specified fields from the IP packet header to build a key, searches the ACLs associated with the interface over which the IP packet arrived for rules corresponding to the key derived from the IP packet, and performs an action associated with any such rules which are found. The filter 34 comprises instructions for locating and applying rules corresponding to received IP packets, and is preferably in the form of software running on a processor. More generally, the filter may contain instructions in the form of any combination of software or hardware within a processor, including hardware within an integrated circuit. The processor need not be a single device, but rather the instructions could be located in more than one device. If in the form of software, the instructions may be stored on a computer-readable medium.

Each specific ACL 26 is associated with a single interface, and each interface may be associated with a corresponding specific ACL. Each specific ACL includes rules particular to the interface to which it corresponds. These rules may include associated actions such as packet denial, packet acceptance, packet counting, and packet copying. Each shared ACL 28 is associated with at least two interfaces, and each interface is associated with at least one shared ACL. Each shared ACL 28 includes rules which some or all interfaces have in common.

Figure 2:
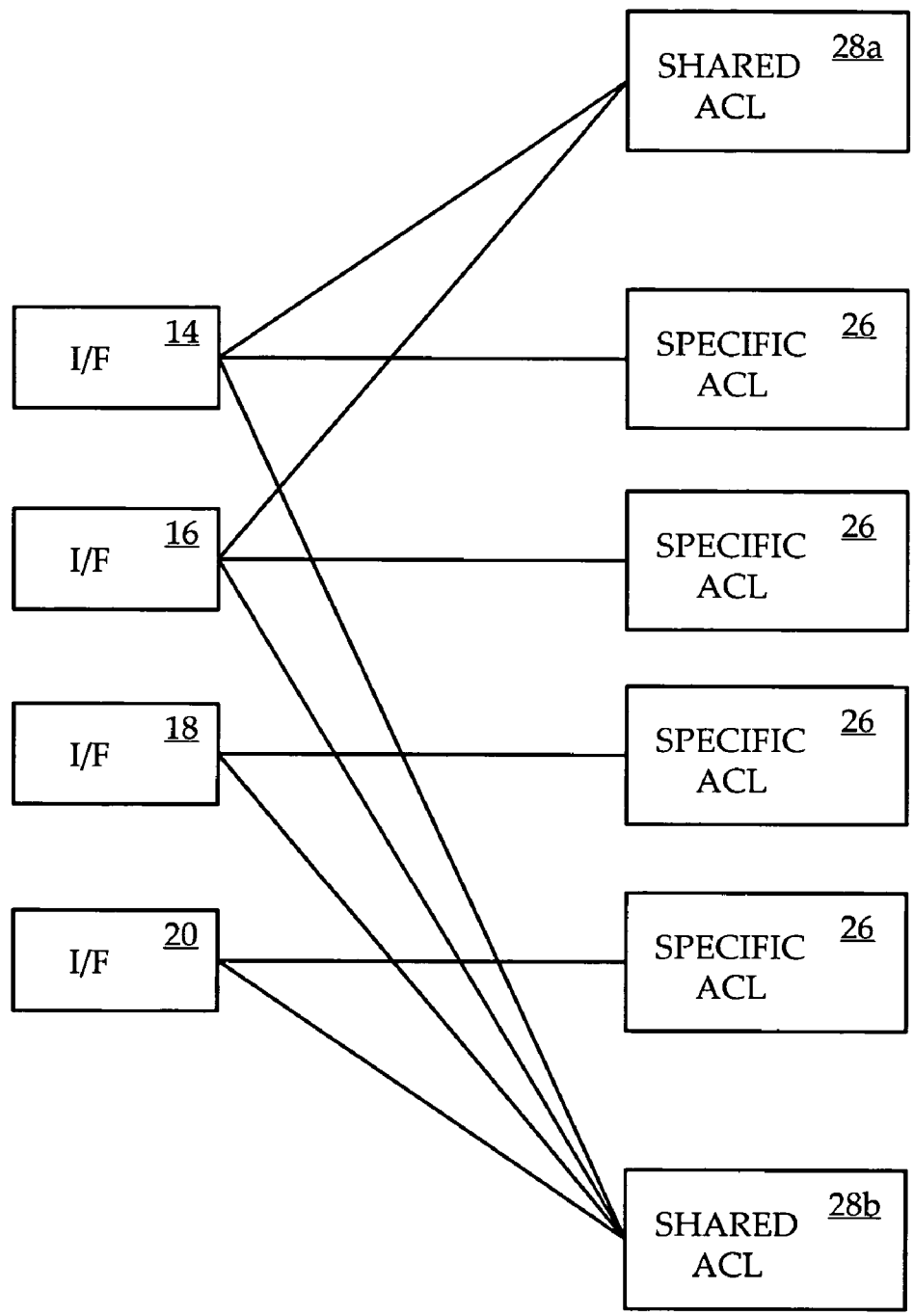
FIG. 2 is a block diagram of an example association between interface cards and ACLs of FIG. 1.

Referring to FIG. 2, and example association between interfaces and ACLs is shown. Each interface has one associated specific ACL 26. Two interfaces 14 and 16 are associated with one shared ACL 28a, and all four interfaces are associated with one shared ACL 28b. Each specific ACL 26 includes rules which may be applied to IP packets arriving over the corresponding interface. The shared ACL 28a includes rules which may be applied to IP packets arriving over either of its two associated interfaces 14 and 16. The shared ACL 28b includes rules which may be applied to IP packets arriving over any of the interfaces.

Since most interfaces typically have more rules in common with at least one other interface than they have rules specific to the interface, a significant saving of TCAM storage can be realized, as can large scaling benefits. For example, consider the case of each interface having 75 rules in common with other interfaces, and having 25 rules specific to the interface, and assume there are 100 interfaces. If each interface had its own unique ACL, TCAM storage for 100 lists of 100 rules each, or 10,000 rules, must be provided. By using a shared ACL, and by allowing rules for an interface to be stored in more than one ACL, TCAM storage must be provided for only one list of 75 rules and 100 lists of 25 rules, or 2575 rules in total.

Returning to FIG. 1, the router 10 also includes a plurality of other line cards 36, the details of which are not shown in FIG. 1. Each of these other line cards 36 is similar to the line card 12, including a plurality of interfaces, a filter, a TCAM, and a plurality of ACLs, although the number of ACLs may differ between line cards.

Figure 3:
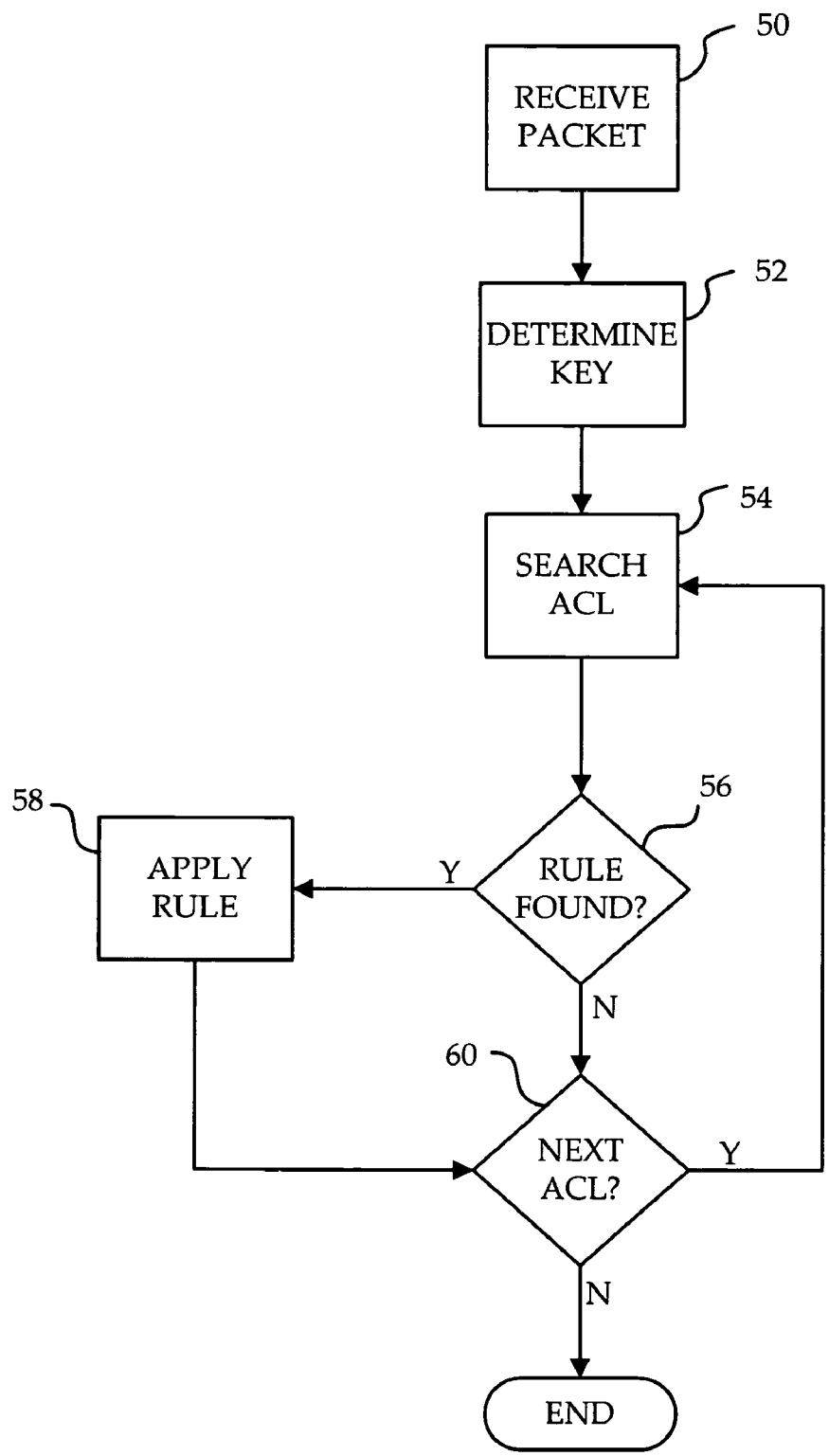
FIG. 3 is a flowchart of a method by which the filter of FIG. 1 accesses rules within the ACLs according to one embodiment of the invention.

Referring to FIG. 3, a method of retrieving and applying a rule for an IP packet according to one embodiment of the invention is shown. At step 50 an IP packet arrives on one of the interfaces 14, 16, 18, and 20. The IP packet has an IP header and a Transmission Control Protocol (TCP) header. At step 52 the filter 34 determines a key for the IP packet from information within the IP header and the TCP header of the IP packet. The key may be determined from such information as an IP source address, an IP destination address, an ICMP type/code, a protocol number, a TCP/UDP source port, and a TCP/UDP destination port.

The filter 34 includes an interface lookup table to determine which ACL or ACLs are to be searched. At step 54 the filter 34 searches within an ACL associated with the interface for a rule matching the key. If at step 56 a rule was found, then the filter applies an action associated with the rule to the IP packet at step 58. Examples of such actions include denial of the packet, acceptance the packet, counting the packet, and copying the packet. There will typically be at least two ACLs associated with the interface, although there may be interfaces on the line card associated with only one ACL. If at step 56 a rule was not found, or if a rule was found then once the action associated with the rule has been applied at step 58, then at step 60 the filter 34 determines whether another ACL exists which is associated with the interface. If at step 60 the filter 34 determines that another ACL associated with the interface exists, then at step 54 the filter 34 searches within the ACL for a rule matching the key. If at step 60 the filter 34 determines that another ACL associated with the interface does not exist, then the filter has finished searching for rules associated with the interface.

The filter 34 may search the ACLs associated with an interface in any order. However, in the preferred embodiment the filter maintains a priority order for each interface. This priority order may be configured by the user.

Not every shared rule need be stored in a shared ACL, and there may be duplication of rules on different specific ACLs. However, this will increase the amount of TCAM storage being used. In order to minimize the amount of TCAM storage required, every shared rule should be stored in a shared ACL.

The line card 12 may have a plurality of TCAMs, each containing at least one of the ACLs.

The invention has been described with respect to a line card having four interfaces, one TCAM, two specific ACLs, and four shared ACLs. More generally, the line card has a plurality of interfaces, and at least two ACLs, at least one of which is a shared ACL. A shared ACL may either contain rules that are shared amongst all interfaces, or contain rules that are shared between only a subset of interfaces. Interfaces may be associated with any number of shared ACLs and may or may not be associated with a specific ACL. However, at least one interface is associated with at least two ACLs, at least one of which is a shared ACL. In this way TCAM storage space can be saved.

A practical limit on the number of ACLs associated with each interface is the ACL access time. The time taken to access the ACLs must be less than the time available to process a packet. For example, the OC-48 line rate requires a packet processing rate of approximately 6.1 Mpps (million packets per second). With current TCAM access rates on the order of 60 to 100 million lookups per second, the number of ACLs associated with each interface is limited to about eight.

The invention has been described with reference to IP packets, routers, and ACLs. More generally, the invention may be applied to any packet switch (such as an Ethernet switch, an ATM switch, or an IPv6 switch) which includes interface specific sets of rules containing rules to be applied to incoming packets. For example, the invention may be applied to more general rule-based security functions, such as rate-limiting and rate-policing, policy-based forwarding, priority assignment, and classification. The key for a received packet may be determined by the filter using any variation of packet header information.

The embodiments presented are exemplary only and persons skilled in the art would appreciate that variations to the above described embodiments may be made without departing from the spirit of the invention. The scope of the invention is solely defined by the appended claims.

I claim:

1. A method of determining rules to be applied to a data packet arriving at a first interface within a data packet router, comprising the steps of:
    associating at least two sets of rules with the first interface, at least one of the sets of rules being a shared set of rules also associated with a second interface, wherein Ternary Content Addressable Memory (TCAM) storage space is saved by storing the shared set of rules in a first Access Control List (ACL);
    storing a set of rules specific to only the first interface in a second ACL;
    determining a key of the data packet;
    searching both the first ACL and the second ACL to determine at least one rule matching the key; and
    applying an action associated with the key-matching rule to the data packet.

2. The method of claim 1 wherein the step of associating at least two sets of rules with the first interface includes associating at least one set of rules with the first interface alone.

3. The method of claim 1 wherein the data packet is an internet protocol (IP) packet, wherein the interface is located within a router, and wherein the step of associating at least two sets of rules with the first interface comprises associating at least two access control lists (ACLs) with the first interface.

4. The method of claim 3 wherein each rule has an associated action, each associated action being one of packet denial, packet allowance, packet counting, and packet copying.

5. The method of claim 3 wherein the key is determined from information contained within a header of the IP packet.

6. The method of claim 5 wherein the information from which the key is determined includes at least one of an IP source address, an IP destination address, a protocol number, a Transmission Control Protocol/User Datagram Protocol (TCP/UDP) source port, a TCP/UDP destination port, and an Internet Control Message Protocol code.

7. The method of claim 1 wherein the step of searching the at least two sets of rules comprises the steps of:
determining a priority order for the at least two sets of rules; and
searching for a rule matching the key in the at least two sets of rules in an order matching the priority order.

8. A method of providing security in a data packet router at which a data packet arrives at a first interface, comprising the steps of:
associating at least two sets of rules with the first interface, at least one of the sets of rules being a shared set of rules also associated with a second interface, each rule in the at least two sets having an associated action, wherein Ternary Content Addressable Memory (TCAM) storage space is saved by storing the shared set of rules in a first Access Control List (ACL);
storing a set of rules specific to only the first interface in a second ACL;
determining a key of the data packet;
searching both the first ACL and the second ACL for at least one rule matching the key; and
when at least one rule matching the key is found, applying the action associated with the key-matching rule to the data packet.

9. The method of claim 8 wherein the step of associating at least two sets of rules with the first interface includes associating at least one set of rules with the first interface alone.

10. The method of claim 8 wherein the data packet is an internet protocol (IP) packet, wherein the interface is located within a router, and wherein the step of associating at least two sets of rules with the first interface comprises associating at least two access control lists (ACLs) with the first interface.

11. The method of claim 10 wherein each associated action is one of packet denial, packet allowance, packet counting, and packet copying.

12. The method of claim 10 wherein the key is determined from information contained within a header of the IP packet.

13. The method of claim 12 wherein the information from which the key is determined includes at least one of an IP source address, an IP destination address, a protocol number, a Transmission Control Protocol/User Datagram Protocol (TCP/UDP) source port, a TCP/UDP destination port, and an Internet Control Message Protocol code.

14. The method of claim 8 wherein the step of searching the at least two sets of rules comprises the steps of:
determining a priority order for the at least two sets of rules; and
searching for a rule matching the key in the at least two sets of rules in an order matching the priority order.

15. A line card comprising:
a first interface;
a second interface;
a first set of rules specific to only the first interface;
a second set of rules shared by the first interface and the second interface; wherein Ternary Content Addressable Memory (TCAM) storage space is saved by storing the second set of rules in a first Access Control List (ACL) and by storing the first set of rules in a second ACL,
means for searching both the first ACL and the second ACL to determine at least one rule applicable to individual data packets arriving at the first interface; and
applying an action associated with the at least one rule to the data packets.

16. The line card of claim 15 wherein the first set of rules and the second set of rules are Access Control Lists (ACLs).

17. The line card of claim 15 wherein the first set of rules is associated with only the first interface.

18. The line card of claim 17 further comprising:
a third interface; and
a third set of rules associated with the first interface and with the second interface; and wherein the means for searching for at least one rule specific to individual data packets arriving at the first interface further comprises searching the third set of rules for such a rule.

19. The line card of claim 15 further comprising
means for associating the first set of rules and the second set of rules to the first interface according to a priority order, and
wherein the means for searching for a rule comprises searching the first set of rules and the second set of rules in the order specified by the priority order.

20. A packet switch comprising the line card of claim 15.

21. A computer-readable medium including instructions for providing security in a data packet router at which a data packet arrives at a first interface, comprising:
instructions for associating at least two sets of rules with the first interface, at least one of the sets of rules being a shared set of rules also associated with a second interface, each rule in the at least two sets of rules having an associated action, wherein Ternary Content Addressable Memory (TCAM) storage space is saved by storing the shared set of rules in a first Access Control List (ACL) and by storing a set of rules specific to the first interface in a second ACL;
instructions for determining a key of the data packet;
instructions for searching both the first ACL and the second ACL for at least one rule matching the key; and
instructions for applying the action associated with each of the at least one rule to the data packet, when at least one rule matching the key is found.

* * * * *